(12) United States Patent
Clark et al.

(10) Patent No.: US 9,066,400 B2
(45) Date of Patent: *Jun. 23, 2015

(54) BI-LEVEL DIMMING CONTROLLER FOR LED LIGHT FIXTURE

(71) Applicants: Walter Blue Clark, Palo Alto, CA (US); Chuan Li, Fremont, CA (US)

(72) Inventors: Walter Blue Clark, Palo Alto, CA (US); Chuan Li, Fremont, CA (US)

(73) Assignee: FINELITE INC., Union City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/121,851

(22) Filed: Oct. 23, 2014

(65) Prior Publication Data

US 2015/0048751 A1    Feb. 19, 2015

Related U.S. Application Data

(63) Continuation of application No. 13/573,048, filed on Aug. 17, 2012, now Pat. No. 8,878,452.

(60) Provisional application No. 61/629,273, filed on Nov. 16, 2011.

(51) Int. Cl.
*H05B 33/08* (2006.01)
*H05B 37/02* (2006.01)

(52) U.S. Cl.
CPC ........ *H05B 33/0845* (2013.01); *H05B 33/0812* (2013.01); *H05B 33/0824* (2013.01); *Y02B 20/343* (2013.01); *H05B 37/02* (2013.01)

(58) Field of Classification Search
None
See application file for complete search history.

(56) References Cited

U.S. PATENT DOCUMENTS

| | | | | |
|---|---|---|---|---|
| 6,011,360 A * | 1/2000 | Gradzki et al. | | 315/244 |
| 6,204,614 B1 * | 3/2001 | Erhardt | | 315/307 |
| 6,853,154 B2 * | 2/2005 | Erhardt | | 315/291 |
| 2002/0180378 A1 * | 12/2002 | Griffin et al. | | 315/224 |

* cited by examiner

*Primary Examiner* — Crystal L Hammond
(74) *Attorney, Agent, or Firm* — James A. Gavney, Jr.; JAG Patent Services

(57) ABSTRACT

A bi-level dimming control circuit is disclosed. The bi-level dimming control circuit is electrically coupled between two switches and a driver circuit that is compatible with 0 to 10 volt dimming signals. The bi-level dimming control circuit controls the output from the driver circuit based on the on and off positions of the switches. In repose to the on and off positions of the switches the driver circuit powers a light engine between a maximum light output mode, a zero light output mode and a reduced or dimmed light output mode. The bi-level control circuit is used to modulate LED light engines, fluorescent light engines and combinations thereof.

15 Claims, 2 Drawing Sheets

BI-LEVEL DIMMING CONTROLLER FOR LED LIGHT FIXTURE

RELATED APPLICATION

This application is a continuation application of the co-pending U.S. patent application Ser. No. 13/573,048, filed Aug. 17, 2012, and titled "BI-LEVEL DIMMING CONTROLLER FOR LED FIXTURE", which claims priority under 35 U.S.C. §119(e) from the U.S. provisional patent application Ser. No. 61/629,273, filed on Nov. 16, 2011, and titled "BI-LEVEL DIMMING CONTROL CIRCUIT FOR LED FIXTURE." The U.S. patent application Ser. No. 13/573,048, filed Aug. 17, 2012, and titled "BI-LEVEL DIMMING CONTROLLER FOR LED FIXTURE" and the provisional patent application Ser. No. 61/629,273, filed on Nov. 16, 2011, and titled BI-LEVEL DIMMING CONTROL CIRCUIT FOR LED FIXTURE" is are both hereby incorporated by reference.

This application claims priority under 35 U.S.C. §119(e) from the U.S. provisional patent application Ser. No. 61/629,273, filed on Nov. 16, 2011, and titled "BI-LEVEL DIMMING CONTROL CIRCUIT FOR LED FIXTURE." The provisional patent application Ser. No. 61/629,273, filed on Nov. 16, 2011, and titled "BI-LEVEL DIMMING CONTROL CIRCUIT FOR LED FIXTURE" is hereby incorporated by reference.

FIELD OF THE INVENTION

This invention relates to lighting systems. More specifically, this relates to controllers for controlling light emitting diode light fixtures.

BACKGROUND OF THE INVENTION

The fluorescent lamp dimming switches have been on the market for many years. Because of the new prominence of LED lighting into the market, a need for LED lighting dimming controllers has emerged. LEDs are ideal light engines for dimming because their efficiency is maintained and even improved over a wide range of light outputs and dimming increases the operating life time LEDs.

Typical dimming controllers used in fluorescent lighting are installed with a 2-wire high-low control system, also referred to as current sink topology. Dimming controllers installed in this fashion are incompatible with the LED drivers that operates with a current source topology. Accordingly, in-wall dimming switches used for controlling fluorescent light can not be used to control dimming LED lighting drivers with LED light engines. Further, where dimming controllers are wired to control dimming of LED light engines, flourescent light engines can not be dimmed using the same dimming controllers.

SUMMARY OF THE INVENTION

The present invention is directed to a lighting system that includes a bi-level dimming controller coupled to a driver for operating a light engine. The driver is a LED driver circuit, or a dimming ballast for fluorescent lights that is compatible with 0 to 10 volt dimming control signals. The bi-level dimming controller effectively works as a adapter between in-wall switches and allows the in-wall switches to be compatible with retro-fitted LED light engines, alone or in combination with fluorescent light engines.

In operation, the bi-level dimming controller is electrically coupled to two switches and at least one LED driver circuit. The LED driver circuit is preferably a constant current LED driver circuit. The bi-level dimming controller is configured to control a constant forward current through the LED driver circuit in order to modulate an LED light engine to operate between two-levels of light output.

When both of the switches are closed, the forward current from the LED driver circuit to the LED light engine is selected to provide a maximum light output. When both of the switches are open, the forward current from the LED driver circuit to the LED light engine is zero and the light output is zero. However, when one of the switches is closed and the other switch is open, a forward current from the LED driver circuit to the light engine is selected to provide a reduced light output. For example, with one of the switches closed and the other switch open, the forward current from the LED driver circuit to the light engine is selected to provide approximately 50 percent of the maximum light output. It will be clear to one skilled in the art that the reduced light output modulated by the bi-level dimming controller can be selected to be any value between zero and 100 percent.

DETAILED DESCRIPTION OF THE INVENTION

Figure 1A:
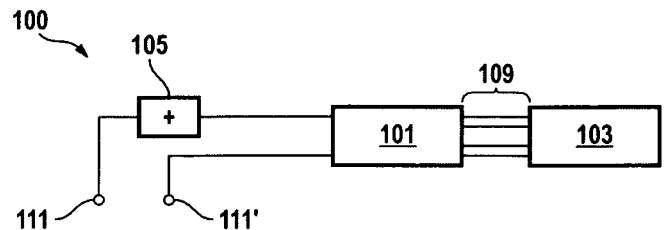
FIG. 1A shows wiring diagram for a two-wire wall dimmer circuit for dimming a fluorescent light engine.

FIG. 1A shows diagram 100 for a two-wire dimmer circuit 100 for dimming a fluorescent light engine 103. The two-wire dimmer circuit 100 includes a hot lead 111 from load that is coupled a dimmer switch 105 . The dimmer switch 105 and a neutral lead 111' from the load are coupled to a driver or ballast circuit 101 for powering the fluorescent light engine 103 through output leads 109. In operation, dimmer switch 105 is adjusted to directly control the current from the load through the driver or ballast circuit 101 for modulating light output from the fluorescent light engine 103. While dimming flourescent lights does reduce energy consumption, flourescent light engines are not ideal for dimming because the operating life-time of the fluorescent light engines is compromised while operating in a dimmed mode. Further, efficiency of power consumption to light output is actually reduced while the fluorescent light engines are operating in the dimmed mode. Also, the two-wire dimmer circuit 100, such as described above, is not compatible with LED driver circuits.

Figure 1B:
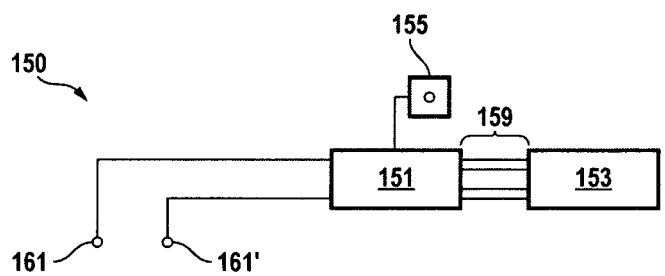
FIG. 1B shows wiring diagram of a dimmer circuit for dimming a LED light engine.

FIG. 1B shows wiring diagram of dimmer circuit 150 for dimming an LED light engine 153. The dimmer circuit 150 includes a hot lead 161 and a neutral lead 161' from load that are coupled to an LED driver circuit 151 to power the LED driver circuit 151. A dimmer 155 is coupled to the driver circuit 151. In operation, the dimmer 155 is adjusted to control the forward current provided by the driver circuit 151 through the output leads 159 for modulating light output from the LED light engine 153. As mentioned LED light engines are ideal for dimming because the life-time of the LED light engines is increased while operating in a dimmed mode and efficiency of power consumption to light output is increased while the LED light engines operate in a dimmed mode. However, the dimmer circuit 150, such as described above, is not compatible with fluorescent light engines and, therefore, fluorescent light engines can not be operated using the sam dimmer 155 and dimming circuit 150.

Figure 2:
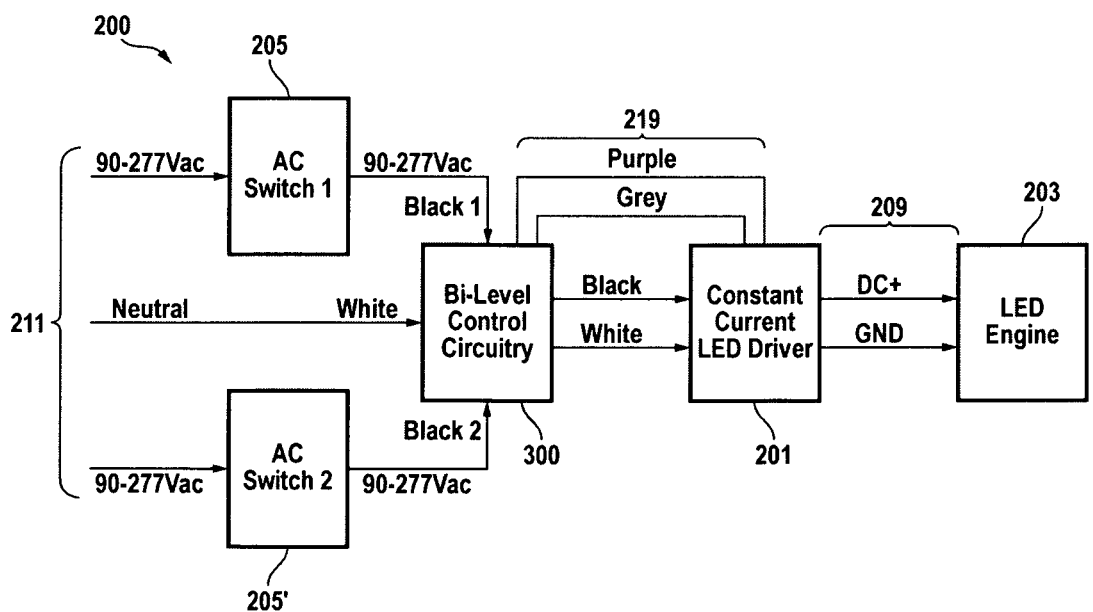
FIG. 2 shows a schematic of a dimming circuit that includes a bi-level dimming controller, in accordance with the embodiments of the invention.

FIG. 2 shows a schematic of a dimming circuit 200 that includes a bi-level control circuit 300, in accordance with the embodiments of the invention. In the dimming circuit 200 of the present invention a first switch 205 and a second switch 205' are coupled to hot leads from load input leads 211. A neutral lead from the load input leads 211, the first switch 205 and a second switch 205' are coupled to the bi-level dimming control circuit 300. The bi-level dimming control circuit 300 is coupled to a constant current LED driver circuit 201 through power leads and control leads 209. The constant current LED driver circuit 201 is coupled to an LED light engine 203 through direct current output leads 209.

In operation, when first switch 205 and a second switch 205' are closed, the bi-level control circuit 300 adjusts the LED driver circuit 201 through the control leads 219 to generate a constant forward current to power the LED light engine 203 to have a maximum light output via the direct current output leads 209. When the first switch 205 and a second switch 205' are opened, the bi-level control circuit 300 adjusts the LED driver circuit 201 through the control leads 219 to generate a zero constant forward current and power down the LED light engine 203 to have zero light output via the direct current output leads 209. When one of the first switch 205 and second switch 205' is closed and the other of first switch 205 and second switch 205' is open, the bi-level control circuit 300 adjusts the LED driver circuit 201 through the control leads 219 to generate a constant forward current to power the LED light engine to have a selected light output. The selected light output is greater than zero light output and less than the maximum light output from the LED light engine 203. Preferably, the selected light output is in a range of 10 percent or greater than 10 percent of the maximum light output of the LED light engine 203 and 90 percent or less than 90 percent of the maximum light output of the LED light engine 203.

The bi-level control circuit 300 allows wall switches 205 and 205' to be used for dimming the LED light engine 203. Further, the bi-level control circuit 300 can be configured to control fluorescent driver circuits that are compatible to 0 Volt to 10 Volt dimming control signals and that are electrically coupled to the bi-level control circuit 300 through additional leads (not shown). Accordingly, a single bi-level control circuit 300 can be used to control both LED light engines and fluorescent light engines through the switches 205 and 205'.

Figure 3:
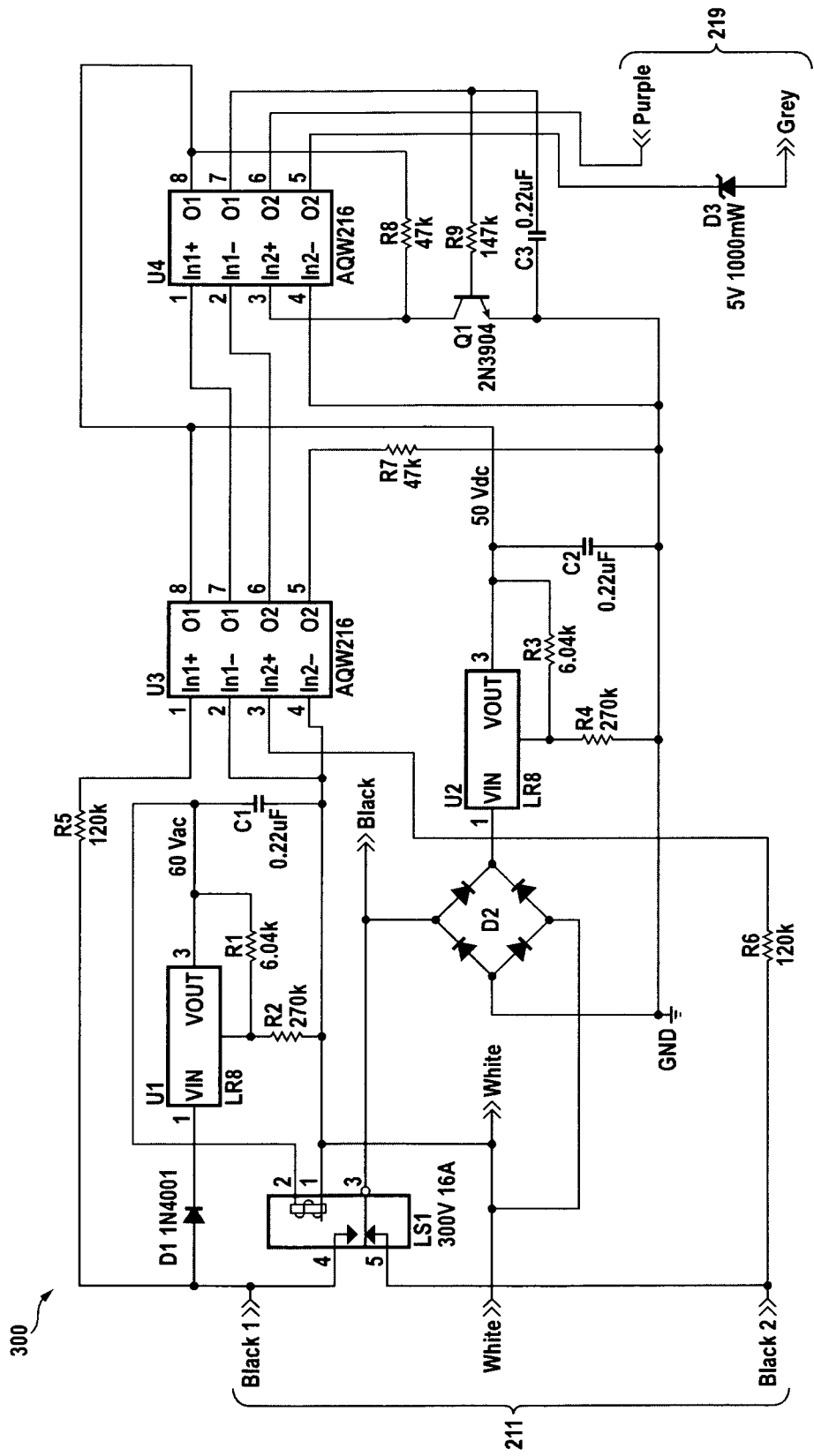
FIG. 3 shows a detailed schematic of a bi-level dimming controller circuit, in accordance with the embodiments of the invention.

FIG. 3 shows a detailed schematic of a bi-level dimming controller circuit 300, in accordance with the embodiments of the invention. The bi-level dimming controller circuit includes two high voltage regulators (U1 and U2), two solid state relays (U3 and U4), one 300V/16 A relay (LS1), one full bridge rectifier (D2), one NPN transistor (Q1), resistors (R) and capacitors (C), as shown. The bi-level dimming controller circuit 300 generates 0 Volt to 10 Volt dimming control signals through the control leads 219 based on the on and off positions of the switches 205 and 205' to modulate light output from the LED light engine 203.

The bi-level dimming controller circuit 300 includes load lead 211 that includes two AC voltage (90 Vac through 277 Vac) hot-line inputs (Black1 and Black2) that are coupled to the first switch 205 and the second switch 205' and a neutral lead, such as shown in FIG. 2. When either of the first switch 205 or the second switch 205' is closed, the bi-level control circuit 300 generates dimming control signals via the control leads 219, designated as Purple (dimming) and Grey (grounding), and the forward current provided by the LED driver circuit 201 to the LED light engine 203 is adjusted to a generate a light output that is less than the maximum light output.

The light output of the LED light engine 203 is nearly linear with respect to DC current output provided by LED driver circuit 201 and the current is approximately linear with respect to the voltage across the purple control lead. Thus, for example, the purple control lead can be set with a default voltages of 10 Vdc relative to the grey control lead. Then when the purple and the grey control lead 219 are open, the LED driver circuit 201 will deliver 100 percent of the DC current to the output leads 209 and power the LED light engine to provide maximum light output. By controlling the voltage across the purple control lead relative to the grey control lead, the percent of the DC current provided to output leads 209 and the corresponding light output from the LED light engine 203 is controlled.

In the reduced light output mode (dimming) (Black1 is open and Black 2 closed), the AC voltage from Black 2 goes to the LED driver circuit 201 through the normally-closed terminal on relay LS1. The AC voltage reaches input Pin 3 on solid state relay—U3 and the 2nd control diode is powered on, such that Pin 6 and Pin 5 on U3 are connected. The Pin 6 and Pin 5 on U3 provide a grounding channel for the diode cathode on U4 In1−. The R5 and R7, R5 provide a current limit resistor to prevent the diode inside relay U3 from burning out. U2 obtains power from the AC voltage output line—Black through a full bridge rectifier D2, which converts 90-277 V into 50 V after R3 and R4 are selected to have a preferred value. C2 functions to smooth the DC output voltage ripples that can occur. A smaller voltage difference between two sides of the regulator is used to reduce the power dissipation of the regulator and to allow the temperature of the lower junction to be maintained. U3 provides 50 Vdc power to Pin 8 of both of the U3 and U4 relays. Because Black 1 is open Pin 1 and Pin 2 on U3 are powered and the power from Pin 8 of U3 does not provide power to Pin 1 on U4. Because Pin 7 on U4 also does not get the power from Pin 8, the transistor Q1 is isolated. Since Pin 3 on U4 acquires the power from Pin 8 through a current limit resistor R8 and Pin 4 is grounded, two output terminals on O2 are closed and Zanier diode D3 on the loop "Purple—D3—Grey" reduces the Vdc across the Purple wire from its default 10 Vdc a selected value to reduce the DC output for the LED driver circuit 201 (FIG. 2).

When Black1 is closed and Black2 is open, D1 works as a half bridge rectifier and brings pulse voltage to the regulator U1. Like U2, U1 is configured to output 50 Vdc which is to drive a high voltage relay to switch the AC voltage from Black2 to Black1, so that the LED driver is able to always obtain the power no matter which switch 205 and 205' is open and which switch 205 and 205' is closed From the current limit resistor R5, the AC current flows from Pin 1 and Pin 2 to U3 and allows Pin 7 to get power from Pin 8 on U4. Since Pin 5 and Pin 6 are off due to zero power at Pin 3 on U3, the current of the diode on Pin 2 of U4 is not grounded and Pin 7 is unable to obtain the power from Pin 8 on U4. Therefore, voltage on the purple control lead is reduced from its default 10 Vdc to a selected value and a reduced DC output from the LED driver circuit 201 (FIG. 2) is maintained to provide dimming.

In maximum light output mode or no dimming (Black1 closed and Black2 closed), U1 and U2 have a DC voltage output and all output terminals of both U3 and U4 (except Pin 6 and Pin 5 on U4) are closed. The diode on Pin 1 of U4 has complete current flow from Pin 1 to the ground. Pin 7 and Pin 8 on U4 are connected, therefore, Pin 7 on U4 have power from Pin 8 to activate the transistor, which pulls the voltage on Pin 3 on U4 down to below 1 Vdc. Because this is below the threshold voltage of the control diode on U4, it is unable to close Pin 6 and Pin 5 and the purple control lead maintain its 10 Vdc default voltage relative to the grey control lead and maximum DC output is provided by the LED driver circuit to provide maximum light output from the LED light engine 203. When Black1 is open and Black2 is open or the switches 205 and 205' are off, no power is provides to the dimming circuit 300 and the LED light engine 203 has zero light output The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A dimming circuit comprising: a bi-level control circuit with two hot input leads for coupling to a load through a first switch and a second switch, a neutral input lead for coupling to the load, the bi-level control circuit further comprising a hot output lead and a neutral output lead for coupling to and for powering one or more driver circuits and control leads for providing control signals that controls the one or more driver circuits to power one or more corresponding light engines to operate between a first light output mode with the first switch and a second switch open and a second light output mode with the first switch and a second switch closed.

2. The dimming circuit of claim 1, wherein the one more driver circuits includes an LED driver circuit.

3. The dimming circuit of claim 2, wherein LED driver circuit is a constant current LED driver circuit.

4. The dimming circuit of claim 1, wherein the dimming mode corresponds to a light output level from the one or more corresponding light engines of between 10 and 90 percent of maximum light output.

5. The dimming circuit of claim 1, wherein the one more driver circuits includes a fluorescent light driver circuit.

6. A lighting system comprising:
a) an LED light engine;
b) a first driver circuit that is an LED driver circuit electrically coupled to the LED light engine for powering the LED light engine through DC output leads;
c) a bi-level controller electrically coupled to the LED driver circuit through power leads for powering the LED driver circuit and control leads for controlling power provided by the LED driver circuit to the LED light engine through the through DC output leads; and
d) switches electrically coupled to the bi-level controller and a load, wherein the bi-level controller provides dimming control signals to the LED driver circuit through control leads with one or more of the switches in the off position and one or more of the two switches in the on position.

7. The lighting system of claim 6, wherein the control leads provide control signals between 0 Volts and 10 Volts to the LED driver circuit and wherein 0 Volts correspond to a zero output mode with the two switches in an off position and 10 Volts corresponds to maximum output mode with the two switches in an on position.

8. The lighting system of claim 7, wherein the dimming control signals are between 1 Volts and 9 Volts with one of the two switches in the off position and one of the two switches in the on position.

9. The lighting system of claim 8, wherein the LED driver circuit is a constant current LED driver circuit.

10. The lighting system of claim 6, further comprising a second driver circuit that electrically coupled to the bi-level controller that is responsive to 0 Volt to 10 Volt control signals generated by the bi-level controller.

11. The lighting system of claim 10, wherein the second driver circuit is a fluorescent light driver circuit.

12. The lighting system of claim 11, wherein the second driver circuit is an LED driver circuit.

13. A method of controlling lights comprising providing control signals to one or more driver circuits that powers one or more corresponding light engines from a bi-level control circuit electrically couple to wall switches that are couple to a load, wherein the control signals corresponds to 0 Volts with both of the two wall switches in an off position, the control signals corresponds to 10 Volts with both of the wall switches in the on position and the control signals corresponds to a value greater than 1 Volt and less than 10 Volts with one of the two switches in the off position and one of the two switches in the on position.

14. The method of claim 13, wherein the one or more driver circuits includes an LED driver circuit.

15. The method of claim 13, wherein the one or more driver circuits includes an fluorescent driver circuit.

* * * * *